Jan. 21, 1964 J. E. SHERMAN 3,119,012

ELECTRONIC ARBITRARY FUNCTION GENERATOR

Filed Jan. 18, 1960 4 Sheets-Sheet 1

INVENTOR.
JOHN E. SHERMAN
BY George C. Sullivan
Agent

INVENTOR.
JOHN E. SHERMAN
BY
George A. Sullivan
Agent

INVENTOR.
JOHN E. SHERMAN
BY George C. Sullivan
Agent

INVENTOR.
JOHN E. SHERMAN
BY
[signature]
Agent

United States Patent Office 3,119,012 Patented Jan. 21, 1964

3,119,012

ELECTRONIC ARBITRARY FUNCTION GENERATOR

John E. Sherman, Los Altos, Calif., assignor to Lockheed Aircraft Corporation, Burbank, Calif.

Filed Jan. 18, 1960, Ser. No. 3,128
4 Claims. (Cl. 235—197)

This invention relates generally to electronic analog computing devices, and more particularly to an improved electronic arbitrary function generator capable of generating single-valued functions of a single variable.

An arbitrary function generator is a device which generates an output signal $f(x)$ in response to the application of an input signal $x$ applied thereto. Such arbitrary function generators are of considerable value and importance in analog computing systems.

In arbitrary function generators which have heretofore been devised, a number of significant deficiencies exist which severely limit their use. In particular, these function generators have the undesirable feature that the noise level of the output function $f(x)$ varies by a considerable amount. Also, the errors occurring in these function generators due to changes in component characteristics are cumulative, making it difficult to generate an output function with any high degree of accuracy or stability. Still further, it is difficult with these function generators to generate output functions $f(x)$ where very sharp slope reversals are required. These deficiencies have greatly limited the usefulness and applicability of presently known arbitrary function generators.

Accordingly, it is the broad object of this invention to provide an improved electronic arbitrary function generator.

A more specific object of this invention is to provide an electronic arbitrary function generator in which the drift and noise inherent in such devices is very greatly reduced.

Another object of this invention is to provide an electronic arbitrary function generator which is capable of generating functions with very sharp slope reversals.

Still another object of this invention is to provide an electronic arbitrary function generator in which the effects of changes in component characteristics are greatly minimized.

A further object of this invention is to provide an electronic arbitrary function generator in accordance with any or all of the above-mentioned objects which is relatively simple and may readily be adjusted to provide any desired output function.

An additional object of this invention is to provide an electronic circuit which is capable of responding to a predetermined range of input signal values, and has a very sharp cut-in and cut-out characteristic.

In accordance with the present invention an arbitrary function generator is provided having function generating units which operate substantially independently of one another so that the slope of the output function is essentially produced by only a single stage operating at any one time. Thus, the drift and noise produced in the slope of the output function is from one stage only and not the cumulative effect of many stages as in presently known function generators.

The specific nature of the invention, as well as other objects, uses and advantages thereof, will clearly appear from the following description and from the accompanying drawing in which.

Figure 1:
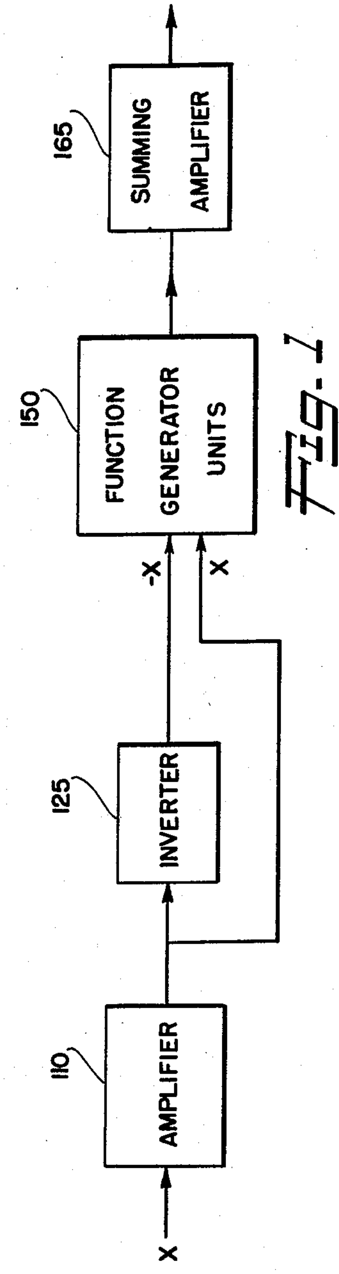
FIGURE 1 is a block diagram of the overall arbitrary function generator in accordance with the present invention.

FIGURE 1 is a block diagram illustrating the arbitrary function generator of the present invention. The predetermined function $f(x)$ which is to be generated from the input signal $x$ is first fed to an amplifier 110 for the purpose of amplifying the input signal $x$ to a predetermined level and providing a low impedance output therefor. The amplified signal $x$ is then split up into two parts, one being applied directly to the function generating units 150 and the other first being applied to an inverter 125 which produces a signal $-x$ which is the negative of the signal $x$. Thus, signals $x$ and $-x$ of predetermined magnitude and low output impedance are fed to the function generating units 150. The function generating units 150 then generate a plurality of discreet signals which when summed approximate the desired output function $f(x)$. The output of the function generating units 150 is thus fed to a conventional type of summing amplifier 165 which sums up these discreet signals to provide a signal corresponding to the desired output function $f(x)$.

Figure 2:
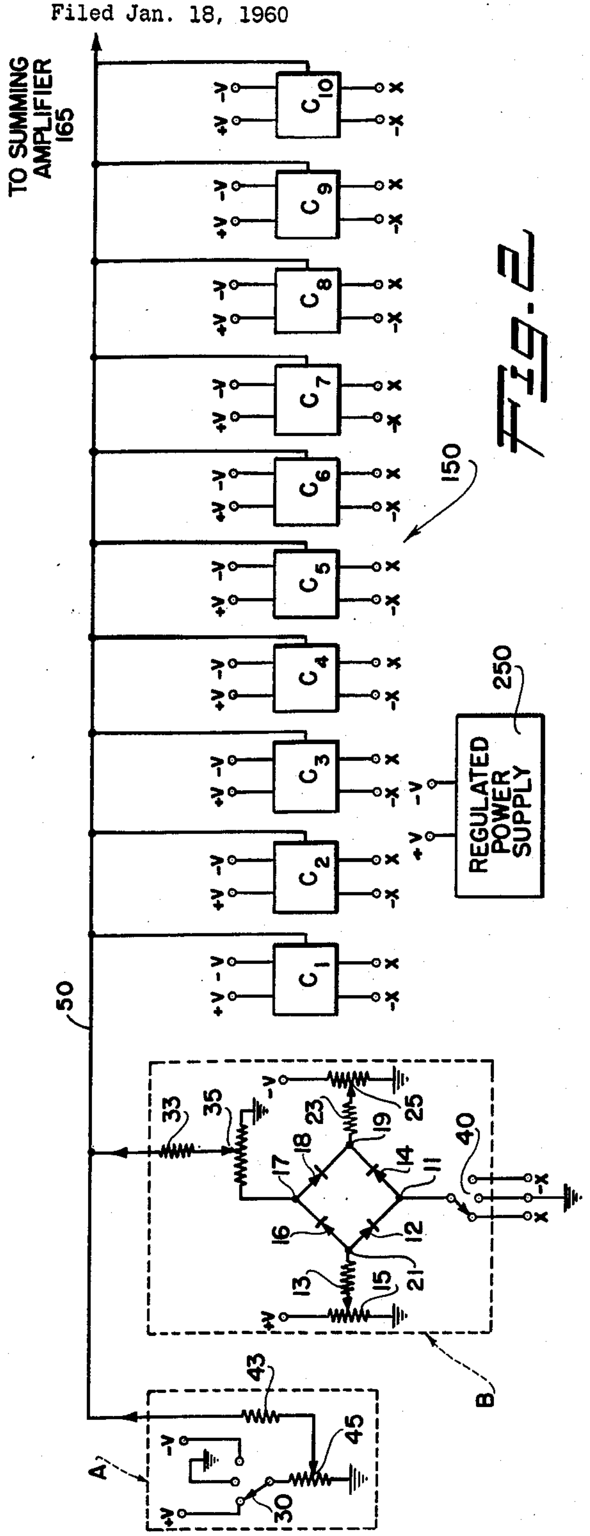
FIGURE 2 is a block and circuit diagram of the function generating units of the arbitrary function generator of FIGURE 1.

The block and circuit diagram of FIGURE 2 shows the function generating units 150 in more detail. It can be seen that the function generating units 150 comprise the function generating units A, B and $C_1$, $C_2$, $C_3$, $C_4$, $C_5$, $C_6$, $C_7$, $C_8$, $C_9$ and $C_{10}$. A regulated power supply 250 is also provided for the purpose of making available the highly stabilized voltage sources +V and −V required for circuit operation.

The unit A comprises a potentiometer 45, a summing resistor 43 connected between the variable arm of the potentiometer 45 and the summing lead 50, and a single-pole, triple-throw switch 30 connected to one end of the potentiometer 45, the other end of the potentiometer 45 being connected to circuit ground. The three contacts of the switch 30 are respectively connected to the positive voltage source +V, circuit ground and the negative voltage source −V. It will thus be seen that the unit A makes it possible to apply a desired fixed voltage to the summing lead 50 through the summing resistor 43. The unit A, therefore, is used to supply the voltage corresponding to the magnitude of $f(x)$ when the input $x$ is zero; that is, the unit A determines the $y$ intercept of the output function $f(x)$. Such a unit A is well known in the analog computer art.

The unit B in FIGURE 2 is also well known in the analog computer art and is commonly termed a diode bridge limiter. In the present invention, the diode bridge limiter of unit B is employed to provide the linear term in the region where the input voltage $x$ is close to zero and the slope of the output function $f(x)$ to be generated corresponding thereto is substantially constant. As far as is presently known, a diode bridge limiter has not heretofore been used as a generating unit of an arbitrary function generator.

It will be seen from FIGURE 2 that the diode bridge limiter of unit B basically comprises a diode bridge consisting of diodes 12, 14, 16 and 18, the plates of the diodes 12 and 16 being connected together at junction 21, the cathodes of the diodes 14 and 18 being connected together at junction 19, the plate of the diode 14 being connected to the cathode of the diode 12 at a signal input junction 11 and the plate of the diode 18 being connected to the cathode of the diode 16 at a signal output junction 17, all in accordance with conventional diode bridge design. A single-pole, triple-throw switch 40 permits the signal input junction 11 to be connected either to the input signal $x$, circuit ground or the negative of the input signal $-x$. The signal output junction 17 is connected through a potentiometer 35 and a summing resistor 33 to the summing lead 50, one end of the potentiometer 35 being connected to junction 17 and the other end being connected to circuit ground.

The other junctions of the diode bridge 21 and 19 are connected to suitable high impedance positive and negative bias voltages, respectively. An adjustable positive bias voltage is provided for the junction 21 by means of a potentiometer 15 having its ends connected between +V and circuit ground and its variable arm connected to the junction 21 through the resistor 13. Similarly, an adjustable negative bias voltage is provided for the junction 19 by means of a potentiometer 25 having its ends connected between −V and circuit ground and its variable arm connected to the junction 19 through a resistor 23.

The operation of a diode bridge limiter such as unit B is well known in the art, and it will be readily understood that an input signal applied at the signal input junction 11 will pass to the signal output junction 17 of the bridge only when the input voltage is between the limits set by the voltages on the variable arms of the potentiometers 15 and 25. The positive bias voltage on the variable arm of the potentiometer 15 determines the maximum positive voltage which will pass through the bridge, while the negative bias voltage on the potentiometer 25 determines the maximum negative voltage which the bridge will pass. The potentiometer 35 connected to the junction 17 determines just how much of the signal which passes to the signal output junction 17 will be applied to the summing lead 50 through the summing resistor 33. This potentiometer 35 will be referred to as a slope potentiometer, since it determines the slope of the output function $f(x)$ when the input signal $x$ is within the limits set by the bias voltages on the variable arms of the potentiometers 15 and 25. In accordance with the present invention, these bias voltages are chosen so that the unit B operates only when the input voltage is in the region close to zero where the slope of the output function $f(x)$ to be generated corresponding thereto is substantially constant, as will hereinafter be described.

The units $C_1$, $C_2$, $C_3$, $C_4$, $C_5$, $C_6$, $C_7$, $C_8$, $C_9$ and $C_{10}$ represent a plurality of function generating units which are used to generate the segments which when summed with the outputs of units A and B produce the desired output function $f(x)$. Units such as represented by $C_1$–$C_{10}$ in FIGURE 2 are presently provided in a variety of ways in presently known arbitrary function generators. However, in these known arbitrary function generators, neither the unit B which generates the linear term of $f(x)$ nor the other generating units are independent from one another; that is, each of these units ordinarily operate to generate the slope of the output function $f(x)$ throughout a wide range of the input signal $x$ and a plurality are usually generating this slope at any one time, the sum of which produce the desired output function $f(x)$. In this type of operation, the drift and noise present in the slope of the resultant output function is cumulative and of significant order. Also, such operation makes it difficult to generate functions with sharp slope reversals.

I have discovered that if each of the function generating units are made independent from one another, that is, if each one generates slope for a different range of values of the input signal $x$ so that essentially only one unit is generating the slope of the output function $f(x)$ at any one time, then the resultant drift and noise in the slope of the output function $f(x)$ will not be cumulative as in presently known arbitrary function generators. Instead, the drift and noise appearing in the slope of the output function will be that of the particular single unit which is operating.

Once the importance of obtaining independence between the function generating units is realized, it is then necessary to determine just what response these generating units should have in order to permit this independence to be obtained. To accomplish this, the unit B which generates the linear term is first restricted to operate only in a predetermined region where the input signal $x$ has a value close to zero. In this region, only the unit B operates. The units $C_1$–$C_{10}$ are provided for generating the output function $f(x)$ for values of $x$ outside this predetermined region, each of the units C generating the output function slope $f(x)$ for a different predetermined range of values of the input signal, so that only one unit C is operating to generate the slope of the output function at any one time, as will hereinafter be described.

Figure 3:
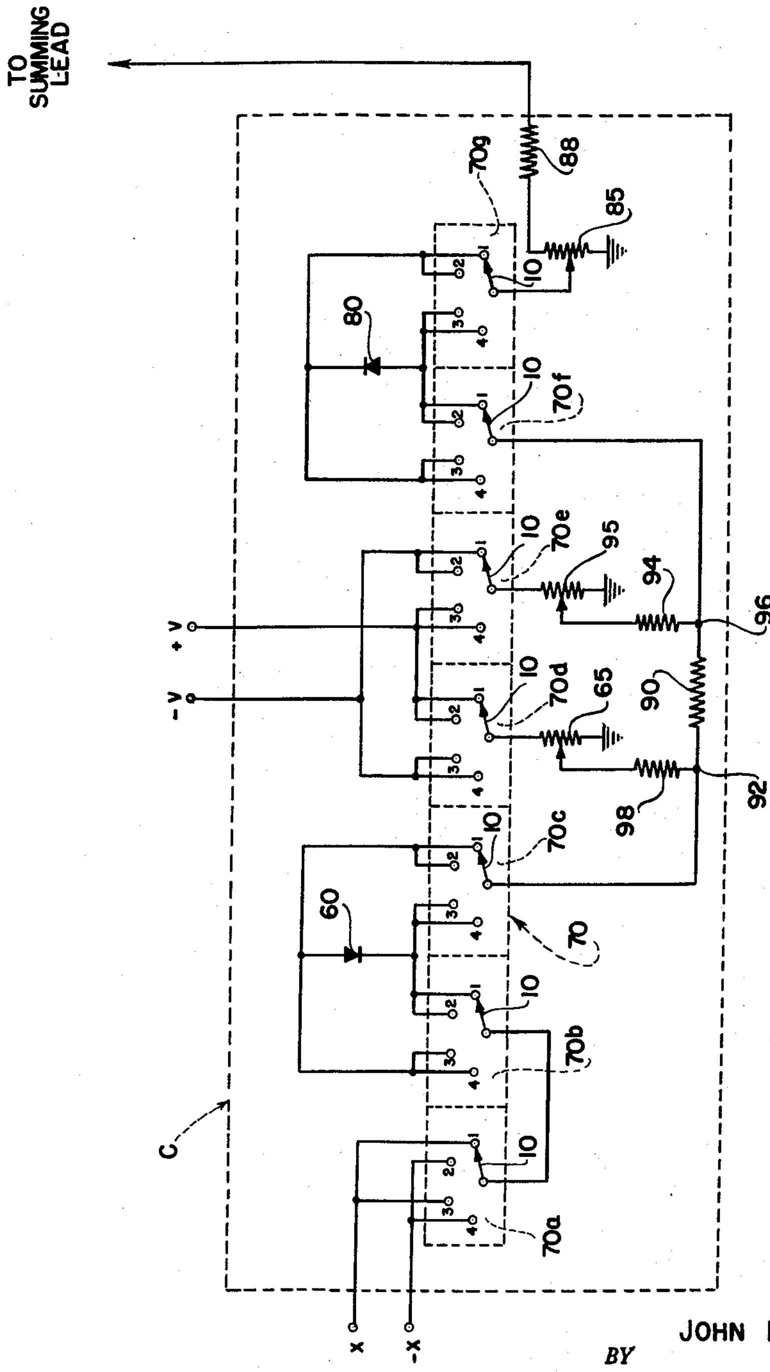
FIGURE 3 is a circuit diagram of one of the function generating units shown in block form in FIGURE 2.

FIGURE 3 shows the detailed design of each of the function generating units C. In each generating unit C, a 7-pole, 4-position switch 70 is provided. The numerals 70_a_, 70_b_, 70_c_, 70_d_, 70_e_, 70_f_ and 70_g_ designate the switch sections of the switch 70, the contacts 1, 2, 3 and 4 indicating the four switch positions thereof. Each of these sections 70_a_–70_g_ has a movable contact 10 which can be switched to any one of four fixed contacts 1, 2, 3 or 4, all of the movable contacts 10 moving in synchronism.

The function generating unit C shown in FIGURE 3 also includes the diodes 60 and 80, potentiometers 65, 95 and 85, and resistors 88, 90, 94 and 98. As shown in FIGURE 2, $x$, $-x$, +V and −V are fed into each of the function generating units $C_1$–$C_{10}$. The switch sections 70_a_–70_g_ of the switch 70 are connected to these components and $x$, $-x$, +V and −V so as to make it possible for each unit C to generate any desired linear output function in the range of input signal values to which each unit is adjusted. The fixed contacts of each of the switch sections 70_a_–70_g_ are connected as follows: The switch section 70_a_ has its fixed contacts 1 and 3 connected to $x$, and its fixed contacts 2 and 4 connected to $-x$. The fixed contacts 1 and 2 of switch section 70_b_ and the fixed contacts 3 and 4 of switch section 70_c_ are all connected to the cathode of the diode 60, while the fixed contacts 3 and 4 of switch section 70_b_ and the contacts 1 and 2 of switch section 70_c_, are all connected to the plate of the diode 60. The fixed contacts 1 and 2 of the switch section 70_d_ and the fixed contacts 3 and 4 of switch section 70_e_ are all connected to the positive voltage +V, while the switch contacts 3 and 4 of switch section 70_d_ and the fixed contacts 1 and 2 of switch section 70_e_ are all connected to the negative voltage −V. The fixed contacts 1 and 2 of switch section 70_f_ and the contacts 3 and 4 of switch section 70_g_ are all connected to the plate of the diode 80, while the fixed contacts 3 and 4 of switch section 70_f_ and the fixed contacts 1 and 2 of section 70_g_ are all connected to the cathode of the diode 80.

Now that the connections of the fixed contacts of the switch sections 70_a_–70_g_ have been described, the connections of the movable contacts 10 thereof are now as follows: The movable contacts 10 of the switch sections 70_a_ and 70_b_ are connected together. The movable contacts 10 of the switch sections 70_c_ and 70_f_ are connected respectively to junctions 92 and 96, between which is connected the resistor 90. The movable arms 10 of switch sections 70_d_ and 70_e_ are respectively connected to one side of potentiometers 65 and 95, the other side of these potentiometers 65 and 95 being connected to circuit ground. The movable arm of the potentiometer 65 is connected to the junction 92 through the resistor 98, while the movable arm of the potentiometer 95 is connected to the junction 96 through the resistor 94. Finally, the movable arm 10 of the switch section 70_g_ is connected to the movable arm of a potentiometer 85 having one end connected to circuit ground and the other end connected to the summing lead 50 through a summing resistor 88.

An examination of FIGURE 3 will reveal that the switch 70 effectively permits the input signal $x$ or its negtive $-x$ to be applied to the unit C, permits the poling of the diodes 60 and 80 to be reversed, and permits the connections to the power source $-V$ and $+V$ to be interchanged. In order to make it easier to explain the operation of the function generating unit C of FIGURE 3 which represents each of the units $C_1$–$C_{10}$ of FIGURE 2, the circuits shown in FIGURES 4–7 will be used. The circuits in these FIGURES 4–7 represent the four possible circuits of the unit C which is obtained for the switch positions 1, 2, 3 and 4. The switch connections of FIGURE 3 have been omitted in FIGURES 4–7 for ease of presentation and greater clarity. The circled number in the upper left corner of each of the FIGURES 4–7 indicates the switch position to which the particular circuit corresponds.

Figure 4:
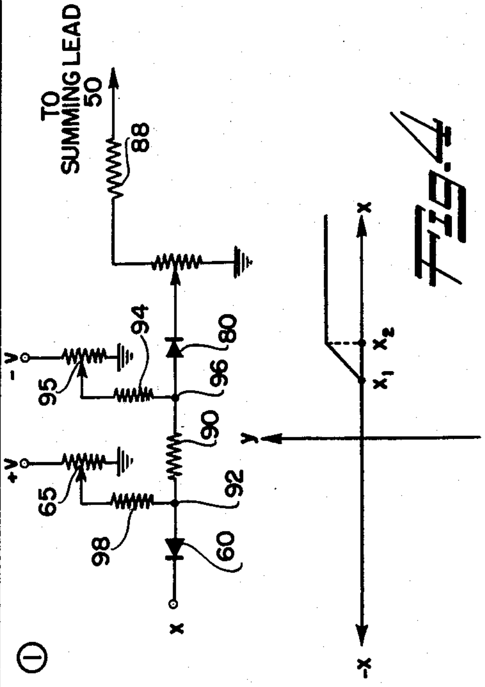
FIGURES 4–7 are circuit diagrams and graphs representing the four circuits which may be provided by the 7-pole, 4-position switch of FIGURE 3, the contacts of the switch being omitted in the circuits of FIGURES 4–7 for greater clarity.
Figure 5:
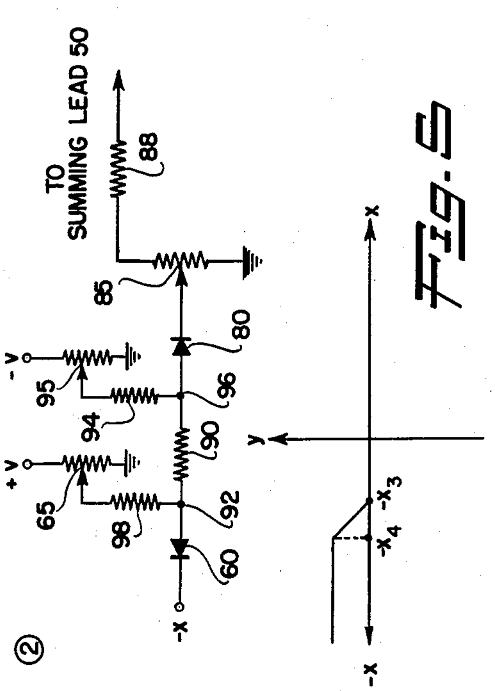
Figure 6:
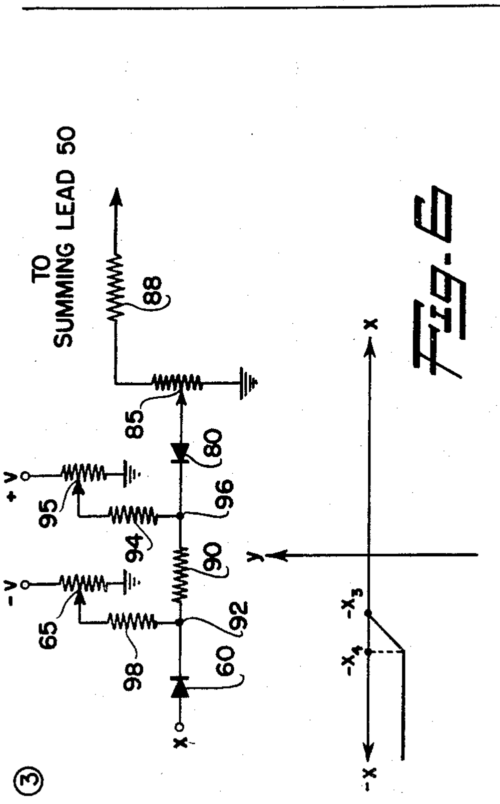
Figure 7:
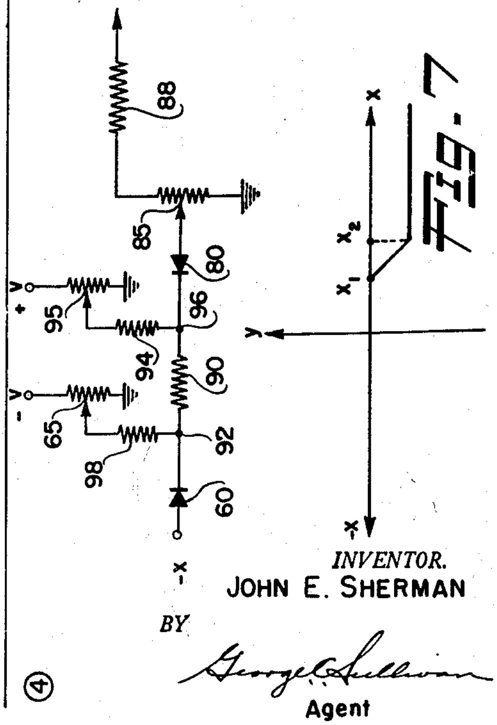

Also presented in each of the FIGURES 4–7 is a graph illustrating the type of output function which each particular circuit is capable of generating. From these graphs it can be seen that the response desired of each unit C is that its output remain zero until the input signal reaches a first predetermined value. Then, as the input signal increases beyond this first predetermined value, the output of the unit C provides an output voltage having either a positive or a negative slope until a second predetermined value of the input voltage is reached. Beyond this second predetermined value, the output of the unit C remains constant. The circuits of FIGURES 4 and 7 are capable of generating linear segments having positive and negative slopes, respectively, between any desired predetermined positive values $x_1$ to $x_2$ of the input signal $x$, while the circuits of FIGURES 5 and 6 are capable of generating linear segments having negative and positive slopes, respectively, between any desired predetermined negative values $-x_3$ to $-x_4$ of the input signal $x$.

Using the circuit and graph of FIGURE 4 as the main example, the operation of each function generating unit C will now be explained in detail. Referring to FIGURE 4, which corresponds to switch position 1, it can be seen that the input signal $x$ is applied to the unit, the positive voltage $+V$ is applied to the potentiometer 65, the negative voltage $-V$ is applied to the potentiometer 95, and the diodes 60 and 80 are poled so that their plates are respectively connected to the junctions 92 and 96. The potentiometers 65 and 95 make it possible to set the voltages appearing at the junctions 92 and 96 to desired predetermined values. It will be shown that the adjustment of these potentiometers 65 and 95 determine the predetermined positive values of the input signal $x$ between which the linear segment of predetermined positive slope will be generated.

As pointed out previously, the circuit of FIGURE 4 is used where a predetermined positive slope is desired between predetermined positive values of the input signal $x$. It will be assumed, therefore, that the desired predetermined range of operation of the circuit of FIGURE 4 is between the positive voltages $x_1$ and $x_2$ of the input signal $x$. In order to obtain the desired linear segment illustrated in the graph of FIGURE 4, the potentiometer 95 is first adjusted so that the voltage at the junction 96 is zero when the voltage at the junction 92 is equal to $x_1$. Secondly, the potentiometer 65 is adjusted so that if the input signal $x$ were unconnected, the voltage at the junction 92 would be equal to $x_2$.

By setting the voltages at the junctions 92 and 96 as just described, the response of the unit will be as illustrated in the associated graph of FIGURE 4. This can be seen from the following analysis. If the value of the input voltage $x$ is greater than $x_2$, the voltage on the cathode of the diode 60 will be greater than the voltage on the plate of the diode 60 so that the diode 60 will not conduct. Thus, for all voltages of $x$ greater than $x_2$ the voltage at the junction 92 will be equal to $x_2$. When the voltage of the input signal $x$ is less than $x_2$, the diode 60 conducts since its plate is now more positive than its cathode. The resistor 98 connected between the junction 92 and the variable arm of the potentiometer 65 is made of sufficiently high impedance so that the junction 92 substantially follows the input voltage $x$ when the input voltage $x$ is less than $x_2$. This will result because if the resistor 98 is large enough, the difference in voltage between the value of $x$ and the voltage on the variable arm of the potentiometer 65 will essentially appear across the resistor 98, so that the junction 92 essentially will be equal to $x$ when $x$ is less than $x_2$. Or, stated another way, the output impedance of the input signal $x$ should preferably be much smaller than the magnitude of the resistor 98. Summarizing now the voltage characteristics at the junction 92, for values of $x$ greater than $x_2$ the voltage at the junction 92 will remain at $x_2$, while for voltages of $x$ less than $x_2$ the conduction of the diode 60 will cause the junction 92 to have essentially the same voltage as $x$.

It should now be remembered that the voltage at the junction 96 has been set by adjusting the potentiometer 95 so that when the voltage at the junction 96 is equal to zero when the voltage at the junction 92 is equal to $x_1$. Thus, when the voltage at the junction 92 is less than $x_1$, the plate of the diode 80 will be at some negative potential, while its cathode is essentially at zero, thereby preventing conduction thereof. Since the voltage at the junction 92 is essentially that of the input signal $x$ for values of $x$ less than $x_2$, it will now be understood that when the value of the input signal is less than $x_1$, the diode 80 does not conduct and the circuit of FIGURE 4 provides no output. When the value of the input signal $x$ is greater than $x_1$ but less than $x_2$, the voltage appearing at the junction 96 will be positive, so that the diode 80 will conduct and permit an output signal to be applied through the potentiometer 85 and the resistor 88 to the summing lead 50. The adjustment of the potentiometer 85 determines the slope of the linear segment which will be generated, and for this reason will be referred to as the slope potentiometer of the function generating unit C, in the same way that the potentiometer 35 of the unit B (FIGURE 2) was referred to as the slope potentiometer thereof.

With the above explanation of the operation of the circuit in FIGURE 4 in mind, it should now be realized that the adjustment of the potentiometer 95 which sets the initial voltage at the junction 96 determines the value of $x_1$ for the circuit, while the adjustment of the potentiometer 65 which sets the voltage at the junction 92 determines the value of $x_2$. It should now be obvious that the circuit of FIGURE 4 is capable of generating the response curve shown in the associated graph of FIGURE 4 where $x_1$ and $x_2$ represent any positive values of the input signal $x$ and the slope is positive as shown, the magnitude of the slope being determined by adjustment of the slope potentiometer 85.

Now that the operation of the circuit of FIGURE 4 has been explained, the operation of the circuits of FIGURES 5–7 should become evident. The curves associated with each of these circuits of FIGURES 5–7 show the type of response which each circuit is capable of generating. By providing each unit C with the four possible circuits shown in FIGURES 4–7 each unit C is capable of generating either a positive or a negative slope between either two positive values $x_1$ and $x_2$ of the input signal, or two negative values $-x_3$ and $-x_4$ of the input signal $x$.

It might be noted that if it is desired to obtain a negative slope, between $x_1$ and $x_2$ instead of the positive slope produced by the circuit of FIGURE 4, the circuit of FIGURE 7 would be used corresponding to switch position 4. In the circuit of FIGURE 7, the negative of the input signal $-x$ is applied to the circuit, the poling of the diodes 60 and 80 are reversed and the voltages $+V$ and $-V$ interchanged. Then, by setting the junction 96 to zero when the negative of the input signal is $-x_3$, and setting the junction 92 to $-x_2$ when the negative of the input signal is unconnected, it will be understood that the circuit of FIGURE 7 will generate a linear output signal which increases negatively as the input signal increases from $x_1$ to $x_2$, thereby providing a negative slope therebetween having a magnitude determined by the slope potentiometer 85. The circuits of FIGURES 5 and 6 operate in a like manner to those of FIGURES 4 and 7, except that they operate for negative values of the input voltage $x$.

Hereinafter the voltage at the junction 92 for which the voltage at the junction 96 is made zero by adjusting the potentiometer 95 will be referred to as the cut-in voltage of the unit C, while the voltage which is set at the junction 92 by adjusting the potentiometer 65 when the input signal $x$ is disconnected will be referred to as the cut-out voltage of the unit C. Thus, it will be seen that for the generation of linear segments of positive slope by the circuits of FIGURES 4 and 6, the cut-in voltage is respectively $x_1$ or $-x_3$ and the cut-out voltage is respectively $x_2$ or $-x_4$; however for the generation of linear segments of negative slope by the circuits of FIGURES 5 and 7 for which the negative of the input signal $-x$ is used, the cut-in and cut-out voltages are the negative of those of FIGURES 4 and 6, namely, the cut-in voltage is respectively $-x_3$ or $x_1$ and the cut-out voltage is respectively $-x_4$ or $x_1$.

Figure 8:
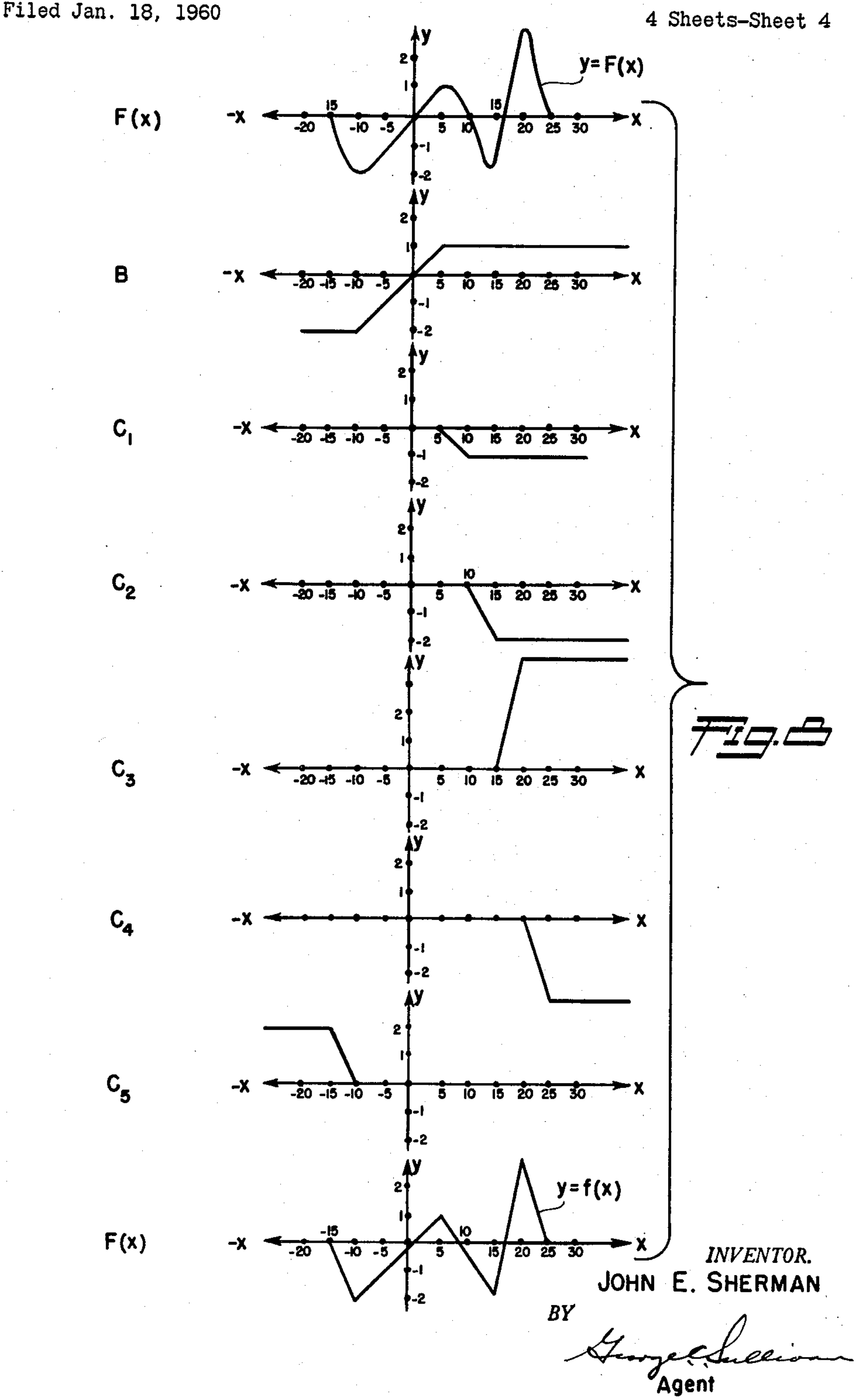
FIGURE 8 is a series of graphs showing how the function generating stages of the arbitrary function generator may be adjusted to provide an exemplary predetermined output function, in accordance with the invention.

Now that I have shown how each unit C is capable of generating any of the linear segments shown in the graphs of FIGURES 4–7, a specific example will now be presented to illustrate how five of the function generating units $C_1$–$C_5$ might be adjusted to generate an exemplary output function $f(x)$, in accordance with the invention. FIGURE 8 is a series of graphs illustrating the linear segment generated by the unit B and the units $C_1$–$C_5$. The top graph $f(x)$ illustrates the single-valued output function which is to be generated. The graphs B, $C_1$, $C_2$, $C_3$, $C_4$, and $C_5$ correspond to the linear segments produced by similary designated units. The bottom graph $f(x)$ illustrates the output function obtained when the outputs of all the linear segments generated by these units are summed. In this specific example, the constant term is made zero by connecting the switch 30 of unit A (FIGURE 2) to its grounded middle contact so that no voltage is applied to the summing lead 50 therefrom. It is to be understood that if desired unit A could be adjusted to provide a predetermined constant positive or negative voltage to the summing lead 50, and this would have the effect of raising or lowering the output function $f(x)$ with respect to the $x$ axis.

In adjusting the units B and $C_1$–$C_5$, it should be remembered that it is most desirable that only one of these units be operating to generate slope at one time, so that the slope of the output function $f(x)$ will effectively be generated by only one unit at a time. To accomplish this the range between which each unit generates slope is chosen between predetermined values of the input signal $x$, preferably without any overlapping.

As explained previously, the diode bridge limiter comprising unit B is provided to generate the output function $f(x)$ in the region where the input signal $x$ is close to zero and the slope of the output function $f(x)$ to be generated corresponding thereto is substantially constant; this region of $x$ close to zero for the exemplary output function $f(x)$ can be seen to be $-10$ to 5 volts. For the unit B, therefore, the variable arm of the potentiometer 15 is adjusted to 5 volts, the variable arm of the potentiometer 25 is adjusted to $-10$ volts, the switch 40 is connected to receive the input signal $x$ to obtain a positive slope, and the slop potentiometer 35 is adjusted to provide the desired slope magnitude corresponding to the magnitude of the slope of $f(x)$ when the input signal $x$ is between $-10$ and 5 volts.

The function generating units $C_1$–$C_5$ are now adjusted so that they will generate the desired output function $f(x)$ for the remaining range of values of the input signal $x$; that is, from 5 to 25 volts on the positive side and from $-10$ volts to $-15$ volts on the negative side. This remaining range of values of the input signal $x$ is now divided between the segment generating stages $C_1$–$C_5$ so that each generating unit C generates a linear segment of predetermined slope for a predetermined range of values of the input signal $x$, without there being any overlapping. Thus, as shown in FIG. 8, the units $C_1$, $C_2$, $C_3$, $C_4$ and $C_5$ are adjusted to generate linear segments of predetermined slope for values of the input signal $x$ between 5 and 10, 10 and 15, 15 and 20, 20 and 25, and $-10$ and $-15$, respectively. More specificially, the unit $C_1$ is adjusted so that it is in switch position 4, its cut-in and cut-out voltages are 5 and 10 volts, respectively, and its slope is equal to that of unit B; the unit $C_2$ is adjusted so that it is also in switch position 4, its cut-in and cut-out voltages are 10 and 15 volts, respectively, and its slope is equal to 1.75 times the slope of unit B; the unit $C_3$ is adjusted so that it is in switch position, 1, its cut-in and cut-out voltages are 15 and 20 volts, respectively, and its slope is 4 times the slope of unit B; the unit $C_3$ is adjusted so that it is in switch position 1, its cut-in and cut-out voltages are 20 and 25, respectively, and its slope is 3 times that of unit B; and finally, the unit $C_5$ is adjusted so that it is in switch position 2, its cut-in and cut-out voltages are $-15$ and $-10$ volts, respectively, and its slope is 2 times the slope of unit B.

When the linear segments generated by the units B, $C_1$, $C_2$, $C_3$, $C_4$ and $C_5$ illustrated in FIG. 8 are all summed by means of the summing amplifier 165 (FIGURE 1), the resultant output function $f(x)$ will be as shown in the bottom graph of FIGURE 8. It can be seen from this lower graph that a line approximation of the desired output function $f(x)$ is obtained. Of course, the more units C that are used, the better the approximation can be made.

It will now be evident that with the function generating stages B and $C_1$–$C_{10}$ chosen so that they each cover a predetermined range of values of the input signal $x$ without any overlapping, the slope of the output function $f(x)$ in each range of values of the input signal $x$ will be provided only by a single function generating stage. It will be appreciated, therefore, that the noise and drift appearing in the slope of the output function $f(x)$ will be caused only by a single unit. Also, since each stage covers only a predetermined range of values of the input signal $x$ and the cut-in and cut-out voltages can be made very sharp, it is possible to generate an output function having a large number of very sharp slipe reversals with a minimum of function generating units.

It is to be understood that the embodiment shown in the drawing and described above is only exemplary and that various modifications can be made in construction and arrangement without departing from the scope of the invention. In particular, it is to be noted that instead of providing a slope potentiometer 85 in the unit C, which gives a linear output segment, it is possible to use a squaring element, for example, or any other type of element which will give other than a linear segment, so as to permit the output function $f(x)$ to be more closely approximated by a plurality of suitable curves rather than the line segments used in the embodiment described. Various other modifications will also occur to those skilled in the art.

It is to be understood, therefore, that this invention is intended to include all modifications and variations which may be made in construction and arrangement coming within the scope of the invention as defined in the appended claims.

I claim as my invention:

1. An arbitrary function generator for generating a predetermined output function $f(x)$ in response to an applied input signal $x$, said function generator comprising: a summing lead, means for applying an adjustable constant D.-C. signal to said summing lead, a first function generating unit for applying to said summing lead a signal which varies linearly at an adjustable rate when the input signal $x$ is between predetermined positive and negative values, a plurality of other function generating units, each of said other units adapted to apply to said summing lead a signal which varies linearly at an adjustable rate with the input signal $x$ only between adjustable values of like polarity thereof, each of said other function generating units comprising an input point to which a signal representative of the input signal $x$ is fed, a first junction point, a second junction point, a resistor interconnecting said first and second junction points an output junction point, an adjustable resistance through which said output junction point is connected to said summing lead, a first diode connected between said input and said first junction point, a second diode connected between said output and said second junction point, the poling of said first diode from said input to said first junction point being the same as the poling of said second diode from said output to said second junction point, and means for applying bias voltages of opposite polarity to said first and second junction points, the bias voltages applied to said first and second junction points being respectively negative and positive when said first and second diodes are poled to permit positive current flow from said input and output points to said first and second junction points respectively, and respectively positive and negative when said first and second diodes are poled to permit negative current flow from said input and output points to said first and second junction points respectively, the magnitude of the bias voltages applied to said first and second junction points determining the predetermined range of values of like polarity of the signal applied to said input point which will apply a proportional output signal to said summing lead, the amount of which is adjusted by means of said adjustable resistance, and means connected to said summing lead for summing the outputs of said units.

2. The invention in accordance with claim 1, wherein means are provided for making the negative of the input signal $-x$ available, and switch means are additionally provided for permitting the negative of the input signal $-x$ to be applied to the input point as well as the input signal $x$, for reversing the poling of said first and second diodes and for interchanging said bias voltages.

3. An electronic circuit adapted to provide an output signal proportional to an input signal applied to the circuit only when the input signal is between a predetermined range of values, said circuit comprising: an input point, a first junction point, a second junction point, a resistor interconnecting said first and second junction points an output junction point, a first diode connected between said input and first junction points, a second diode connected between said output and second junction points, the poling of said first diode from said input to said first junction point being the same as the poling of said second diode from said output to said second junction points, and means for applying bias voltages of opposite polarity to said first and second junction points, the bias voltages applied to said first and second junction points being respectively negative and positive when said first and second diodes are poled to permit positive current flow from said input and output points to said first and second junction points respectively, and respectively positive and negative when said first and second diodes are poled to permit negative current flow from said input and output points to said first and second junction points respectively, the magnitude of the bias voltages applied to said first and second junction points being such that one of said junction points is at zero voltage while the other junction is biased at cut-in voltage, the said other junction also being set for cut-out voltage when no signal is applied to the said input point, a high impedance connected between said means for applying bias voltages and said other junction so that the voltage at said other junction substantially follows the input voltage when the input voltage is between the values of the cut-in and cut-out voltages, whereby a proportional output signal is produced at said output point when the input signal lies between said cut-in and said cut-out voltages.

4. The invention in accordance with claim 3 wherein switch means are additionally provided for reversing the polarity of said diodes and for interchanging said bias voltages.

References Cited in the file of this patent

UNITED STATES PATENTS

| | | |
|---|---|---|
| 2,896,082 | Raymond et al. | July 21, 1959 |
| 2,975,369 | Vance | Mar. 14, 1961 |
| 2,976,430 | Sander | Mar. 21, 1961 |

OTHER REFERENCES

Miura et al.: "A New Diode Function Generator," IRE PGEC, June 1957, pp. 95–100.

Medkeff et al.: "A Diode Bridge Limiter for Use with Electronic Analogue Computers," Trans AIEE, 1951, vol. 70, pp. 913, 916.